US012230874B2

(12) United States Patent
Chi et al.

(10) Patent No.: US 12,230,874 B2
(45) Date of Patent: Feb. 18, 2025

(54) SUBSTRATE-INTEGRATED CIRCULARLY POLARIZED ELECTROMAGNETIC RADIATION STRUCTURE AND ARRAY

(71) Applicant: PONTOSENSE INC., Waterloo (CA)

(72) Inventors: Lidong Chi, Guangdong (CN); Alex Qi, Waterloo (CA); Yunlong Luo, Guangdong (CN); Ge Shi, Guangdong (CN); Yihong Qi, Guangdong (CN); Ruini Xue, Guangdong (CN); Ronghao Jin, Guangdong (CN); Zhanghua Cai, Guangdong (CN)

(73) Assignee: PONTOSENSE INC., Waterloo (CA)

( * ) Notice: Subject to any disclaimer, the term of this patent is extended or adjusted under 35 U.S.C. 154(b) by 176 days.

(21) Appl. No.: 18/251,380

(22) PCT Filed: Nov. 3, 2021

(86) PCT No.: PCT/CN2021/128299
§ 371 (c)(1),
(2) Date: May 1, 2023

(87) PCT Pub. No.: WO2022/095866
PCT Pub. Date: May 12, 2022

(65) Prior Publication Data

US 2023/0411839 A1 Dec. 21, 2023

(30) Foreign Application Priority Data

Nov. 4, 2020 (CN) ......................... 202011215729.2

(51) Int. Cl.
*H01Q 1/38* (2006.01)
*H01Q 1/50* (2006.01)
(Continued)

(52) U.S. Cl.
CPC ................. *H01Q 1/38* (2013.01); *H01Q 1/50* (2013.01); *H01Q 21/065* (2013.01); *H01Q 21/24* (2013.01)

(58) Field of Classification Search
CPC .......... H01Q 1/38; H01Q 1/50; H01Q 21/065; H01Q 21/24; H01Q 19/108; H01Q 21/062; H01Q 9/285; H01Q 21/06
See application file for complete search history.

(56) References Cited

U.S. PATENT DOCUMENTS 11,476,585 B1 * 10/2022 Abdelmonem ........ H01Q 21/26

FOREIGN PATENT DOCUMENTS

CN 101807739 A 8/2010
CN 103022730 A 4/2013
(Continued)

OTHER PUBLICATIONS

International Search Report; International Patent Application No. PCT/CN2021/128299; Jan. 28, 2022; China National Intellectual Property Administration (ISA/CN), Beijing, China.

*Primary Examiner* — David E Lotter
(74) *Attorney, Agent, or Firm* — Andrew D. Fortney; Central California IP Group, P.C.

(57) ABSTRACT

Disclosed is a substrate-integrated circularly polarized electromagnetic radiation structure. A plurality of connection points are provided between an upper metal radiation structure and a lower metal backplane; the upper metal radiation structure consists of a metal ring and two metal branches disposed within the metal ring; the metal branches are bent structures; the metal ring is a rectangular ring structure; the two metal branches are rotational symmetric by 180 degrees relative to a feeder center, and a serpentine structure composed of the two metal branches enables same to achieve circular polarization (comprising left-hand circular polariza-
(Continued)

tion and right-hand circular polarization) within broadband and to achieve beam directivity.

9 Claims, 3 Drawing Sheets

(51) Int. Cl.
*H01Q 21/06* (2006.01)
*H01Q 21/24* (2006.01)

(56) References Cited

FOREIGN PATENT DOCUMENTS

| | | | |
|---|---|---|---|
| CN | 107275765 | A | 10/2017 |
| CN | 108631055 | A | 10/2018 |
| CN | 213366792 | U | 6/2021 |
| WO | 2017032107 | A1 | 3/2017 |

* cited by examiner

SUBSTRATE-INTEGRATED CIRCULARLY POLARIZED ELECTROMAGNETIC RADIATION STRUCTURE AND ARRAY

This application is a national phase application of International Application No. PCT/CN2021/128299, filed on Nov. 3, 2021, pending, which claims the benefit of Chinese Patent Application No. 202011215729.2, filed Nov. 4, 2020.

TECHNICAL FIELD

The present invention relates to the field of antennas, and in particular to a substrate-integrated circularly polarized electromagnetic radiation structure and arrays.

BACKGROUND ART

For satellite communication and remote sensing systems, in order to transmit information effectively and overcome polarization distortion caused by ionospheric Faraday rotation effect, it is required that the antenna has circular polarization performance. Also, the same antenna array works simultaneously in receive and transmit modes, which requires that the antenna has left-hand circular polarization and right-hand circular polarization. For military purposes, the circularly polarized antennas are also widely used as basic radiating elements in the field of space target early warning. Therefore, the circular polarization technology is widely used in military and civilian fields.

The polarization of an antenna characterizes the time-varying orientation of an electric field strength vector at a given point in space as the antenna radiates, and is described by the time-varying trajectory of the endpoints of the electric field strength vector. The polarization of the antenna can be divided into three forms: linearly polarized, circular polarization and elliptical polarization. If the linearly polarized antenna is used as the receiving end, the polarization mismatch will easily occur, which will affect the receiving and transmitting quality of the antenna. However, the circularly polarized antenna has the following advantages. The circularly polarized antenna can receive any linearly polarized wave, and the circularly polarized wave radiated by the circularly polarized antenna can also be received by any polarized antenna. The circularly polarized antenna has a orthogonality with direction of rotation. If the antenna radiates a right-hand circularly polarized wave, it only receives the right-hand circularly polarized wave but not the left-hand circularly polarized wave, and vice versa. The ideal polarization isolation can be achieved by using the orthogonality with direction of rotation. The circularly polarized wave is incident on the symmetrical target, and the reflected wave transforms the direction of rotation, etc. It is because of these characteristics that the circularly polarized antenna has strong anti-interference capability, which has been widely used in electronic reconnaissance and interference, polarization diversity of communication and radars, and electronic countermeasure.

Xue-Xia Yang et al. in “A Polarization Reconfigurable Patch Antenna with Loop Slots on the Ground Plane,” IEEE Antennas and Wireless Propagation Letters, 2012, 11(2):69-72, designed a polarization reconfigurable square microstrip antenna. The ground metal plates corresponding to two corners on the same side of the square radiating patch are respectively provided with a slot, and a switch diode is respectively placed in the two slots, so that the polarization can be reconfigured by controlling the open and close states of the switch. However, the bandwidth of this antenna is too narrow and there is no advantage in performance.

SUMMARY OF THE INVENTION

The object of the present invention is that, in order to solve the problem of narrow band width of polarization reconfigurable antennas in the prior art, the present invention provides a substrate-integrated circularly polarized electromagnetic radiation structure and arrays, which can realize circular polarization (including left-hand circular polarization and right-hand circular polarization) in a wide band and realize beam directivity.

In order to achieve the above object, the technical solution adopted by the invention is as follows.

A substrate-integrated circularly polarized electromagnetic radiation structure comprises an upper metal radiation structure, a lower metal backplane and a feeder; a plurality of connection points are provided between the upper metal radiation structure and the lower metal backplane;

the upper metal radiation structure comprises a metal ring, and two metal branches disposed within the metal ring; the metal branches are bent structures; the two metal branches are arranged symmetrically relative to a feeder center; and the metal ring is a rectangular ring structure.

The serpentine structure of two metal branches makes it possible to achieve circular polarization (including left-hand circular polarization and right-hand circular polarization) in a wide band and to achieve beam directivity.

Preferably, an intermediate dielectric substrate is provided between the upper metal radiation structure and the lower metal backplane; and a via hole is provided on the intermediate layer substrate at a position corresponding to a connection point between the upper metal radiation structure and the lower metal backplane.

Preferably, the metal branches are L-shaped bent structures bent by 90 degrees.

Preferably, the metal ring has a length and width ranging from 0.2 to 1.5 times the wavelength of a lowest operating frequency of an antenna.

Preferably, the upper metal radiation structure comprises a multi-turn metal ring of different sizes and being concentric.

Preferably, the metal ring has at least one notch.

Preferably, the feeder comprises a probe connected to one of the metal branches, and the probe passes through a via hole of the intermediate dielectric substrate.

Preferably, the feeder comprises a probe, the probe being located in a region between two metal branches and having a spacing from the two metal branches; and the probe passes through the via hole of the intermediate dielectric substrate.

A substrate-integrated circularly polarized electromagnetic radiation structure array is provided. The array is composed of a plurality of substrate-integrated circularly polarized electromagnetic radiation structures as claimed in any one of claims 1-8; the array comprises a left-handed substrate-integrated circularly polarized electromagnetic radiation structure and a right-handed substrate-integrated circularly polarized electromagnetic radiation structure.

Preferably, when the left-hand substrate-integrated circularly polarized electromagnetic radiation structure is used for emitting a left-hand circularly polarized wave, the left-hand circularly polarized wave irradiates a measured object to reflect back a right-hand circularly polarized wave, and the right-hand substrate-integrated circularly polarized electromagnetic radiation structure is used for receiving the right-hand circularly polarized wave;

when the right-hand substrate-integrated circularly polarized electromagnetic radiation structure is used for emitting a right-hand circularly polarized wave, the right-hand circularly polarized wave irradiates a measured object to reflect back a left-hand circularly polarized wave, and the left-hand substrate-integrated circularly polarized electromagnetic radiation structure is used for receiving the left-hand circularly polarized wave.

In summary, due to the adoption of the technical solution, the invention has the following beneficial effects.

According to a substrate-integrated circularly polarized electromagnetic radiation structure and arrays, a plurality of connection points are provided between an upper metal radiation structure and a lower metal backplane; the upper metal radiation structure consists of a metal ring and two metal branches disposed within the metal ring; the metal branches are bent structures; the metal ring is a rectangular ring structure; the two metal branches are rotational symmetric by 180 degrees relative to a feeder center, and a serpentine structure composed of the two metal branches enables same to achieve circular polarization (comprising left-hand circular polarization and right-hand circular polarization) within broadband and to achieve beam directivity.

BRIEF DESCRIPTION OF THE DRAWINGS

FIG. 4(*c*) is a schematic diagram of a substrate-integrated circularly polarized electromagnetic radiation structure of multiple metal rings.

FIG. 5(*b*) is a schematic diagram of a sparsely-arranged array of a substrate-integrated circularly polarized electromagnetic radiation structure.

FIG. 7(*b*) is a schematic diagram of a substrate-integrated circularly polarized electromagnetic radiation structure with the coupled feed by a probe.

Figure 1:
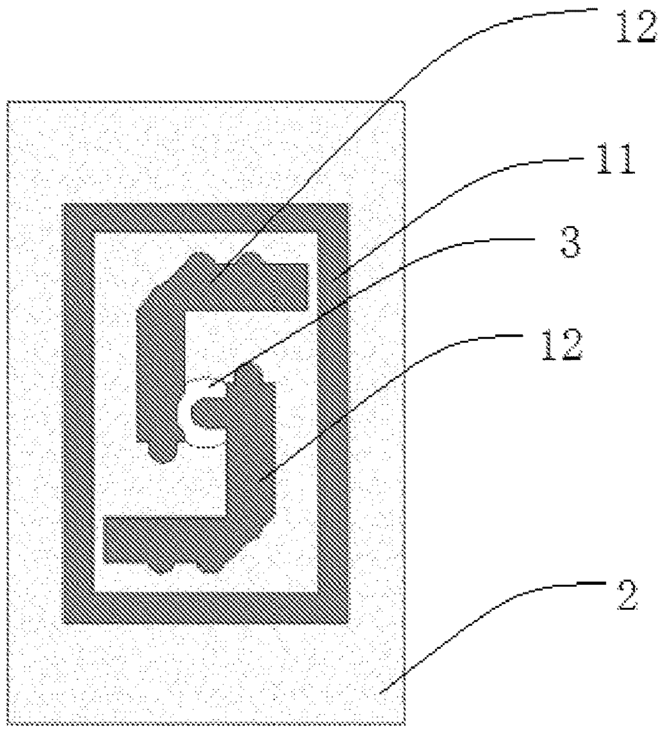
FIG. 1 is a schematic diagram of a left-handed substrate-integrated circularly polarized electromagnetic radiation structure.

Reference numerals in the drawings: 1—upper metal radiation structure, 11—metal ring, 12—metal branch, 2—lower metal backplane, 3—feeder, 31—probe, 4—connection point.

DETAILED DESCRIPTION OF THE INVENTION

Hereinafter, the present invention will be described in detail with reference to the accompanying drawings.

In order that the objects, aspects, and advantages of the present invention will become more apparent, a more particular description of the invention will be rendered by reference to the appended drawings and embodiments. It should be understood that the specific embodiments described herein are merely illustrative of the invention and are not intended to be limiting thereof.

Embodiment 1

As shown in FIG. 1, a substrate-integrated circularly polarized electromagnetic radiation structure comprises an upper metal radiation structure 1, a lower metal backplane 2 and a feeder 3.

The upper metal radiation structure comprises a metal ring 11, and two metal branches 12 disposed within the metal ring. The metal branches 12 are bent structured. The two metal branches 12 are rotational symmetric by 180 degrees relative to a feeder 3 center. The metal ring 11 is a rectangular ring structure.

Figure 3:
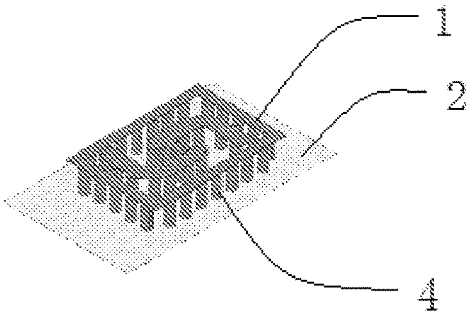
FIG. 3 is a perspective view of a substrate-integrated circularly polarized electromagnetic radiation structure.

As shown in FIG. 3, a plurality of connection points 4 are provided between the upper metal radiation structure and the lower metal backplane. An intermediate dielectric substrate is provided between the upper metal radiation structure and the lower metal backplane. A via hole is provided on the intermediate layer substrate at a position corresponding to a connection point between the upper metal radiation structure and the lower metal backplane. The metal branch 12 is a bent structure bent by 90 degrees. The benefit of such a connection is that feed balancing, circular polarization and high gain can be achieved.

The part enclosed by the upper metal ring 11 is the main radiating part of the antenna, which can work independently or can radiate in multiple groups of arrays. The size of the upper metal radiation structure 1 is between 0.2 and 1.5 wavelengths of the lowest operating frequency of the antenna (e.g., between 1 mm and 7.5 mm for 60 GHz and 0.76 mm and 5.77 mm for 78 GHz).

Figure 2:
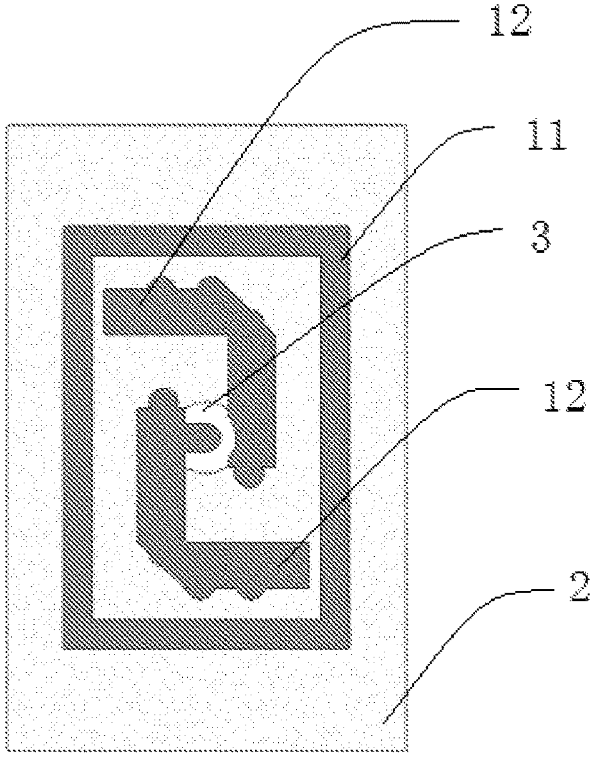
FIG. 2 is a schematic diagram of a right-handed substrate-integrated circularly polarized electromagnetic radiation structure.

The lower metal backplane 2 mainly functions as a reflection, and is wherein it includes an upper metal portion. Namely, the lower metal plate includes a portion where the upper metal portion (including the metal branch 12 and the metal ring 11) is projected onto the lower metal backplane 2. The circularly polarized wave can be divided into left-hand circular polarization and right-hand circular polarization according to the electric field direction division, for example, the left-hand circular polarization form of the circularly polarized antenna shown in FIG. 1, and the right-hand circular polarization form shown in FIG. 2. The two circularly polarized versions of the antenna are mirror symmetric.

Embodiment 2

Figure 4A:
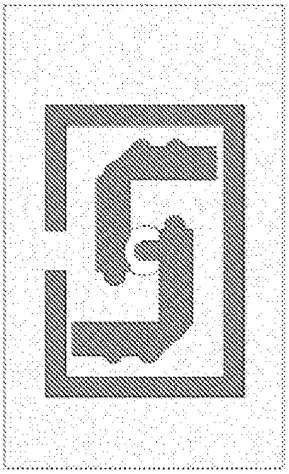
FIGS. 4(*a*) and 4(*b*) are schematic diagrams of a substrate integrated circularly polarized electromagnetic radiation structure of a discontinuous metal ring.
Figure 4B:
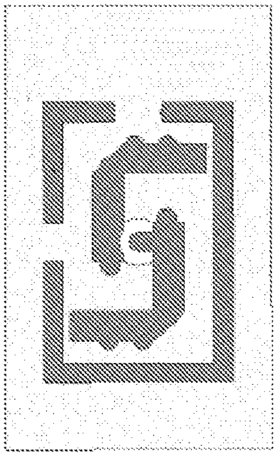
Figure 4C:
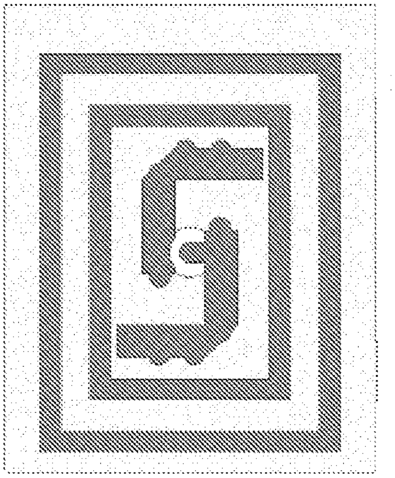
Figure 5A:
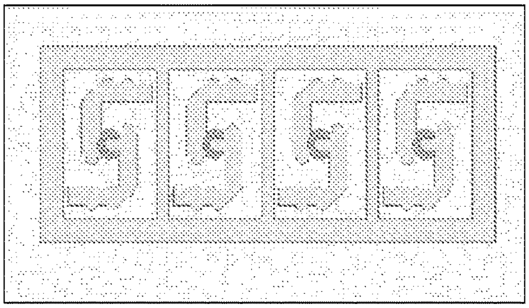
FIG. 5(*a*) is a schematic diagram of a closely-arranged array of a substrate-integrated circularly polarized electromagnetic radiation structure.
Figure 5B:
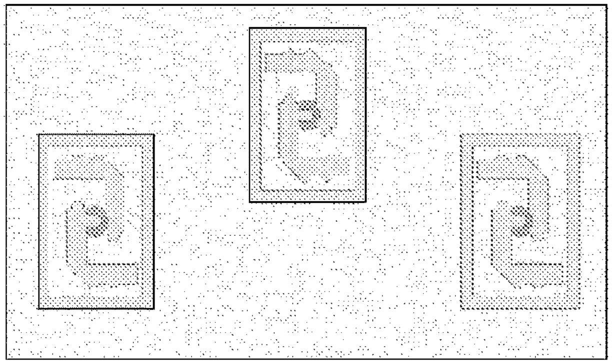

The antenna may be a circularly polarized antenna. The upper metal radiation structure is a plurality of metal branches 12 with rotational symmetry. The outer side of the metal branch 12 may be provided with a surrounding structure, either a ring-shaped structure or a ring-shaped structure with a notch. The metal ring 11 has a basic feature of being located at the periphery of the two metal branches. The specific shape thereof has many forms, such as a discontinuous metal ring form (as shown in FIG. 4(*a*) and FIG. 4(*b*), opened on the metal ring 11) and a multi-turn metal ring form (as shown in FIG. 4(*c*)). In addition, in the case of a small-pitch array of antenna elements (as shown in FIG. 5(*a*)), the metal rings 11 are adjacently connected.

Embodiment 3

The antennas may form an array. An array may include different rotation directions for transmitting and receiving, respectively. FIG. 5 shows a specific structure of an array. Two arrangements. One is a close array arrangement, as shown in FIG. 5(*a*). The array spacing is small, and the top metal of adjacent units will be connected. The other is a sparse array arrangement, as shown in FIG. 5 (*b*). The array arrangement pitch is large and the top metal of adjacent units are not connected.

Embodiment 4

Figure 6:
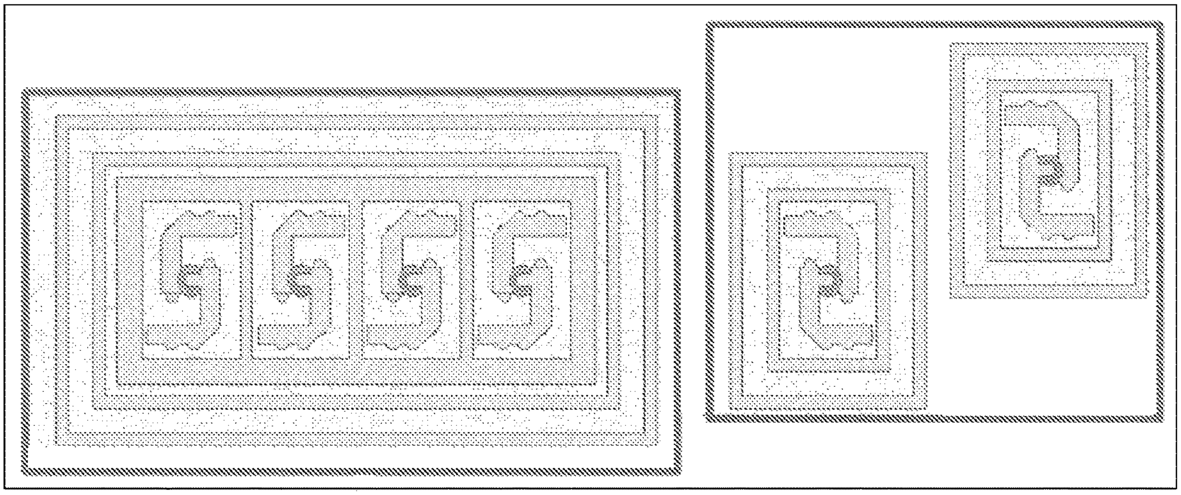
FIG. 6 is a schematic diagram of an array of a substrate-integrated circularly polarized electromagnetic radiation structure according to Embodiment 4.

An antenna for radar detection may employ transmit-receive heteropolarization to combat multipath interference, as shown in FIG. 6. The principle of anti-multipath interference is (taking the transmitting as left-hand circular polarization as an example) that the left-handed circularly polarized wave is emitted by the transmitting antenna of the radar, and the right-handed circularly polarized wave reflected by the measured object is received by the receiving antenna, while the second reflected wave changes back to the left-handed circularly polarized wave which the receiving antenna cannot receive. The energy of the wave reflected more than twice is already weak and has little effect on reception.

Embodiment 5

Figure 7A:
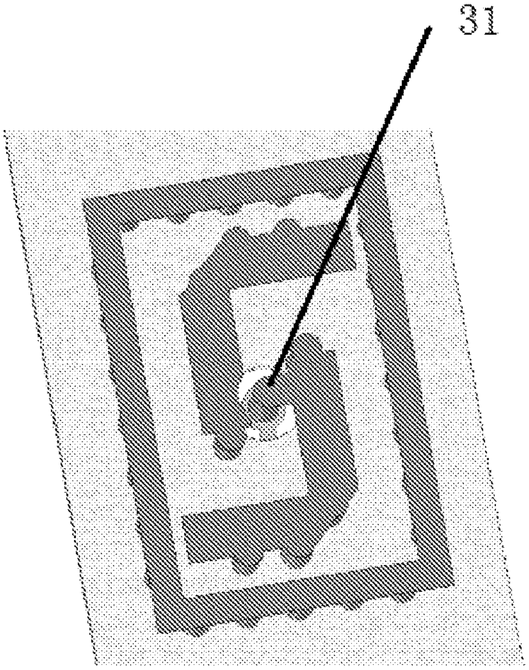
FIG. 7(*a*) is a schematic diagram of a substrate-integrated circularly polarized electromagnetic radiation structure with the direct connection feed by a probe.
Figure 7B:
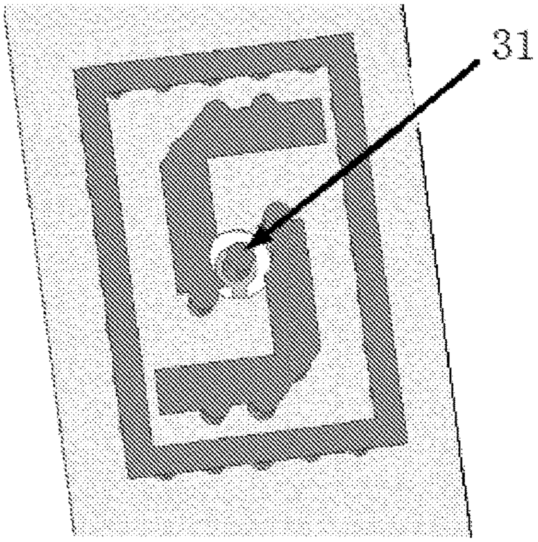

The feed of the antenna may be by direct connection or coupling of the probe. The probe 31 is realized by a metal via hole. The metal via hole is connected to one of the top metal branches 12 in a direct connection mode of the probe, as shown in FIG. 7(*a*). The metal via is disconnected from both top metals in a probe-coupled feed mode, as shown in FIG. 7(*b*).

The above mentioned are only preferred embodiments of the invention and not intended to limit the invention. Any modification, equivalent substitution and improvement made within the spirit and principles of the invention shall be covered by the protection of the invention.

What is claimed:

1. A substrate-integrated circularly polarized electromagnetic radiation structure, wherein comprising an upper metal radiation structure, a lower metal backplane and a feeder; a plurality of connection points are provided between the upper metal radiation structure and the lower metal backplane;

the upper metal radiation structure comprises a metal ring, and two metal branches disposed within the metal ring; the metal branches are bent structures; the two metal branches are arranged symmetrically relative to a feeder center; and the metal ring is a rectangular ring structure;

wherein an intermediate dielectric substrate is provided between the upper metal radiation structure and the lower metal backplane; and a via hole is provided on the intermediate layer substrate at a position corresponding to a connection point between the upper metal radiation structure and the lower metal backplane.

2. The substrate-integrated circularly polarized electromagnetic radiation structure according to claim 1, wherein the metal branches are L-shaped bent structures bent by 90 degrees.

3. The substrate-integrated circularly polarized electromagnetic radiation structure according to claim 2, wherein the metal ring has a length and width ranging from 0.2 to 1.5 times the wavelength of a lowest operating frequency of an antenna.

4. The substrate-integrated circularly polarized electromagnetic radiation structure according to claim 2, wherein the upper metal radiation structure comprises a multi-turn metal ring of different sizes and being concentric.

5. The substrate-integrated circularly polarized electromagnetic radiation structure according to claim 2, wherein the metal ring has at least one notch.

6. The substrate-integrated circularly polarized electromagnetic radiation structure according to claim 2, wherein the feeder comprises a probe connected to one of the metal branches, and the probe passes through a via hole of the intermediate dielectric substrate.

7. The substrate-integrated circularly polarized electromagnetic radiation structure according to claim 2, wherein the feeder comprises a probe, the probe being located in a region between two metal branches and having a spacing from the two metal branches; and the probe passes through the via hole of the intermediate dielectric substrate.

8. A substrate-integrated circularly polarized electromagnetic radiation structure array, wherein the array is composed of a plurality of substrate-integrated circularly polarized electromagnetic radiation structures as claimed in claim 1; the array comprises a left-handed substrate-integrated circularly polarized electromagnetic radiation structure and a right-handed substrate-integrated circularly polarized electromagnetic radiation structure.

9. The substrate-integrated circularly polarized electromagnetic radiation structure array according to claim 8, wherein when the left-hand substrate-integrated circularly polarized electromagnetic radiation structure is used for emitting a left-hand circularly polarized wave, the left-hand circularly polarized wave irradiates a measured object to reflect back a right-hand circularly polarized wave, and the right-hand substrate-integrated circularly polarized electromagnetic radiation structure is used for receiving the right-hand circularly polarized wave;

when the right-hand substrate-integrated circularly polarized electromagnetic radiation structure is used for emitting a right-hand circularly polarized wave, the right-hand circularly polarized wave irradiates a measured object to reflect back a left-hand circularly polarized wave, and the left-hand substrate-integrated circularly polarized electromagnetic radiation structure is used for receiving the left-hand circularly polarized wave.

* * * * *